United States Patent [19]

Hickey, Jr. et al.

[11] Patent Number: 4,941,927
[45] Date of Patent: Jul. 17, 1990

[54] FABRICATION OF 18% NI MARAGING STEEL LAMINATES BY ROLL BONDING

[75] Inventors: Charles F. Hickey, Jr., Ashland, Mass.; Timothy S. Thomas, Springfield, Va.

[73] Assignee: The United States of America as represented by the Secretary of the Army, Washington, D.C.

[21] Appl. No.: 343,778

[22] Filed: Apr. 26, 1989

[51] Int. Cl.$^5$ .............................................. C21D 8/02
[52] U.S. Cl. .................. 148/11.5 Q; 148/2; 228/235; 228/205; 228/176
[58] Field of Search ............ 428/683; 148/11.5 Q, 148/2; 228/235, 205, 176

[56] References Cited

U.S. PATENT DOCUMENTS

| | | | |
|---|---|---|---|
| 3,093,519 | 6/1963 | Decker et al. | 148/31 |
| 4,098,607 | 7/1978 | Rizzitano et al. | 75/243 |
| 4,443,254 | 4/1984 | Floreen | 420/96 |
| 4,736,884 | 4/1988 | Tsuyama et al. | 228/235 |

FOREIGN PATENT DOCUMENTS

| | | | |
|---|---|---|---|
| 44-13584 | 6/1969 | Japan | 428/683 |
| 58-19412 | 2/1983 | Japan | 428/683 |
| 1215923 | 3/1986 | U.S.S.R. | 228/205 |

OTHER PUBLICATIONS

Antolovich et al., "Martensite Formation and Dimensional Anisotropy in Laminated Maraging Steel", Journal Iron Steel Inst., London, 211(9), 622–27.
Antolovich et al, "Fracture Toughness of Duplex Structures II Laminates in the Divider Orientation", Amer. Soc. Test Material, Spec. Tech. Public, STP 5/4, 135–50, 55–8.

Primary Examiner—Deborah Yee
Attorney, Agent, or Firm—Richard J. Donahue

[57] ABSTRACT

A method of fabricating 18% Ni maraging steel laminates of varying alloy compositions by roll bonding. Laminates composed of a plurality of different grades of Cobalt-containing or Cobalt-free maraging steels are disclosed.

4 Claims, No Drawings

FABRICATION OF 18% NI MARAGING STEEL LAMINATES BY ROLL BONDING

RIGHTS OF GOVERNMENT

The invention described herein may be manufactured used and licensed by or for the Government for Governmental purposes without the payment to us of any royalty thereon.

BACKGROUND OF THE INVENTION

1. Field of the Invention

The invention relates to the fabrication of 18% Ni maraging steel laminates of varying alloy compositions by roll bonding.

2. Description of the Prior Art

Maraging steels are iron-nickel martensites that are hardened by the precipitation of Mo and Ti containing intermetallic compounds. Cobalt, molybdenum, and titanium are added in various amounts to the basic alloy to produce a final product of varying strength levels from 200 to 350 KSI.

Methods of manufacturing cobalt-containing maraging steels of a specific alloy formulation are well known in the prior art. Recently, U.S. Pat. No. 4,443,254 describes a method for producing a cobalt-free version of the 250 and 300 KSI strength levels of the 18% Ni maraging steels.

It is known that steel can be roll bonded into laminate form. The steels to be bonded are heated to a selected temperature and then pressed together under high pressure to effect the bond. However, in quenched and tempered steels, there is a strong tendency for the laminates to separate and buckle during the quenching process due to non-uniform dimensional changes induced by rapid cooling and non-uniform expansion due to the formation of martensite.

The present invention addresses fabrication and lamination of a precipitation hardening type steel which can be air cooled from both the solution and aging temperature. Thus, the difficulties associated with the rapid cooling rate in the heat treatment of the quenched and tempered steel is avoided in the slow cooling of the maraging steels.

SUMMARY OF THE INVENTION

The invention may be summarized as a method of fabricating selected combinations of 18% Ni maraging steels to produce a material of enhanced properties, for example, increased ballistic performance. Hardening, which is achieved in the maraging steels during aging, is retained at room temperature by air cooling. A rapid quench, such as water or oil, is not required. The various grades (strength/hardness levels) are all compatible to the same heat treatment and have very similar coefficients of thermal expansion ($5.0$ to $7.5 \times 10^{-6}/°F.$ from 70° to 900° F.).

Laminates composed of a plurality of different grades of cobalt-containing (C) or cobalt-free (T) maraging steels may be tailored to provide solutions to problems not otherwise solvable by the use of a single grade of material. For instance, a high hardness grade can be used as a front material and a lower hardness grade for the rear material to enhance ballistic performance. The front harder grade will serve to break up the projectile and the lower hardness rear material will act in an impact absorbing role.

In addition to avoiding the problems of warping and delamination which result from the rapid cooling of quenched and tempered steels, maraging steel laminates can be expected to possess the known improved formability and weldability characteristics of their component layers. The maraging steel laminates will also be more cost effective to produce due to their inherently less expensive air cooling process and a higher yield of product without defects.

The method of the invention comprises the steps of providing a quantity of at least two different alloys of maraging steel, forming sheets of each of a selected thickness, roll bonding the sheets together at an elevated temperature, and cooling the resulting laminate in air to ambient temperature.

The resulting laminate is a unique material not heretofore available having the properties and advantages described above.

DESCRIPTION OF THE PREFERRED EMBODIMENT

In accordance with the general method of the disclosure, specific laminate combinations have been fabricated by the following procedure.

Quantities of maraging steel charge stock are formed into twenty inch ingots by a series of melting steps comprising argon-oxygen decarburizing, vacuum induction melting, and finally vacuum arc melting. The ingots are heated to a homogenization temperature (2200°-2275° F.) and upset forged into fourteen by six inch length slabs which are then conditioned (ground to remove surface defects), heated to a temperature of 1950°-2000° F. and rolled into 0.10-0.50 inch thickness plates. The plates are ground, cleaned, sized, and matched with a desired laminate mate. The selected combinations are then heated to a temperature of 1900°-2000° F. and rerolled to effect the bond. The resulting laminates are air cooled to ambient temperature and mechanically finished to size.

Maraging steels of particular interest which were chosen for initial experimentation are cobalt-containing (C) and cobalt-free (T) alloys available from Teledyne Vasco, Latrobe, PA 15650. These are designated by their alloy component and KSI strength level. For cobalt-containing alloys there are C-200, C-250, C-300, and C-350 stock available. For cobalt-free, T-200, T-250, and T-300.

The nominal compositions of the cobalt-containing and cobalt-free alloys are as follows:

| Alloy | Ni % | Co % | Mo % | Ti % | Al % | Fe % |
|---|---|---|---|---|---|---|
| C-200 | 18.5 | 8.5 | 3.25 | .20 | .10 | Balance |
| C-250 | 18.5 | 7.5 | 4.80 | .40 | .10 | " |
| C-300 | 18.5 | 9.0 | 4.80 | .60 | .10 | " |
| C-350 | 18.5 | 12.0 | 4.80 | 1.40 | .10 | " |
| T-200 | 18.5 | 0 | 3.00 | .70 | .10 | " |
| T-250 | 18.5 | 0 | 3.00 | 1.40 | .10 | " |
| T-300 | 18.5 | 0 | 4.00 | 1.85 | .10 | " |

The balance of the compositions of the cobalt-containing and cobalt-free alloys shown in the Fe % column, while being substantially iron, also includes small amounts of silicon (0.10% max.), manganese (0.10% max.), carbon (0.03 max.), sulfur (0.01% max.) and phosphorus (0.01% max.). The balance of the cobalt-containing alloys additionally includes small amounts of zirconium (0.01%) and boron (0.003%).

Laminate combinations which were fabricated by the above described method include

T-300—T-250
T-300—T-200
C-350—T-250
C-350—T-200

Having fully described the method of preparing and product comprising a novel maraging steel laminate, the invention is hereby defined by the following claims.

What is claimed is:

1. A method of fabricating a laminate of at least two layers of maraging steel comprising in combination the steps of:
   a. providing a quantity of stock of a first maraging steel alloy;
   b. providing a quantity of stock of a second maraging steel alloy;
   c. melting each of said alloys to form an ingot of selecting size;
   d. heating said ingots to a selected forging temperature;
   e. forging said ingots into slabs of a selected size;
   f. heating said slabs to a selected rolling temperature;
   g. rolling said slabs into plates of a selected size;
   h. grinding at least one surface of each of said plates flat to a selected tolerance;
   i. placing said flat surfaces in mutual contact;
   j. heating said plates to a selected roll bonding temperature;
   k. rolling said plates to effect the bond to form said laminate;
   l. air cooling said laminate to ambient temperature.

2. The method of claim 1 wherein said rolling temperature is approximately 1975° F.

3. The method of claim 1 wherein said roll bonding temperature is approximately 1925° F.

4. The method of claim 1 wherein said alloys are selected from the group comprising T-200, T-250, T-300, and C-350.

* * * * *